United States Patent
O'Brien et al.

(10) Patent No.: US 10,439,915 B2
(45) Date of Patent: Oct. 8, 2019

(54) NETWORK STATUS EVALUATION (71) Applicant: SOLARWINDS WORLDWIDE, LLC, Austin, TX (US)

(72) Inventors: Chris O'Brien, Austin, TX (US); Lan Li, Austin, TX (US); Rick Matejka, Austin, TX (US); Karlo Zatylny, Dripping Springs, TX (US)

(73) Assignee: SOLARWINDS WORLDWIDE, LLC, Austin, TX (US)

( * ) Notice: Subject to any disclaimer, the term of this patent is extended or adjusted under 35 U.S.C. 154(b) by 0 days.

(21) Appl. No.: 15/487,709

(22) Filed: Apr. 14, 2017

(65) Prior Publication Data

US 2018/0302308 A1  Oct. 18, 2018

(51) Int. Cl.
  *H04L 12/26* (2006.01)
  *H04L 12/24* (2006.01)

(52) U.S. Cl.
  CPC ...... *H04L 43/0888* (2013.01); *H04L 41/0631* (2013.01); *H04L 41/0654* (2013.01); *H04L 41/5009* (2013.01); *H04L 43/045* (2013.01); *H04L 43/062* (2013.01); *H04L 43/08* (2013.01); *H04L 43/10* (2013.01); *H04L 43/16* (2013.01)

(58) Field of Classification Search
  CPC ... H04L 43/0888; H04L 43/062; H04L 43/16; H04L 43/10; H04L 43/045; H04L 41/0654
  See application file for complete search history.

(56) References Cited

U.S. PATENT DOCUMENTS

| 8,028,199 | B1 | 9/2011 | Guruprasad et al. |
| 2006/0176824 | A1* | 8/2006 | Laver ............ H04L 41/00 370/241 |
| 2007/0230361 | A1* | 10/2007 | Choudhury ....... H04L 29/06027 370/250 |
| 2015/0039749 | A1 | 2/2015 | Kwan et al. |

FOREIGN PATENT DOCUMENTS

WO  2017/059904 A1  4/2017

OTHER PUBLICATIONS

Bing Wang et al., "Fault Localization Using Passive End-to-End Measurement and Sequential Testing for Wireless Sensor Networks", IEEE Communications Society Conference, Jun. 22, 2009, pp. 1-10.
European Search Report application No. 18163551.7 dated Jun. 8, 2018.

* cited by examiner

*Primary Examiner* — Dady Chery
(74) *Attorney, Agent, or Firm* — Squire Patton Boggs (US) LLP (57) ABSTRACT

An apparatus and method for a service network status in a communication network are provided. A method may include deriving a baseline or a threshold for network performance of at least one endpoint in a network. The method may also include evaluating a service network status of the network by comparing current performance metrics of the at least one endpoint to the baseline or the threshold. In addition, the method may include determining, when the evaluated service network status is degraded, at least one node or at least one link that is causing the service network status to be degraded using a root cause analysis.

18 Claims, 3 Drawing Sheets

| Endpoint Status | Where Any Condition is True (first match takes precedence) |
|---|---|
| Critical | Percent Endpoint Unreachable >= Percent Endpoint Unreachable Critical Threshold |
| | Percent Port Closed >= Percent Port Closed Critical Threshold |
| | Average Packet Loss >= Endpoint Percent Packet Loss Critical Threshold |
| | Average Latency >= Latency Critical Threshold |
| | (Average Latency - Baseline Latency) >= Latency Critical Threshold |
| | (Average Latency - Baseline Latency)/Baseline Latency >= Latency Increase Critical |
| Warning | Percent Endpoint Unreachable Warning Threshold <= Percent Endpoint Unreachable < Percent Endpoint Unreachable Critical Threshold |
| | Percent Port Closed Warning Threshold <= Percent Port Closed < Percent Port Closed Critical Threshold |
| | Endpoint Percent Packet Loss Warning Threshold <= Average Packet Loss < Endpoint Percent Packet Loss Critical Threshold |
| | Latency Warning Threshold <= Average Latency < Latency Critical Threshold |
| | Latency Warning Threshold <= (Average Latency - Baseline Latency) < Latency Critical Threshold |
| | Latency Warning Threshold <= (Average Latency - Baseline Latency)/Baseline Latency < Latency Critical Threshold |
| Good | Any cases that are not covered above |

NETWORK STATUS EVALUATION

BACKGROUND

Field

Various embodiments pertain to communication networks and an evaluation of the communication networks. In particular, various embodiments may relate to detecting and analyzing a network status of a given communication network.

Description of the Related Art

Given the complexity of modern communication networks, it is often difficult to detect, let alone fix, various performance issues within a network. At least part of the difficulty is derived from the multiple routes that clients within the same network can use to reach an endpoint service. When a client attempts to use a particular service provided by a network, the client sends a request to an endpoint in the communication network that provides the service. The endpoint can be one or more servers that are responsible for performing or operating the requested network service.

The request, however, can take one of multiple paths to reach the endpoint. Each path may include a plurality of network entities that forward the request from the client through the network until the service endpoint is reached. In addition, once the client request is finally able to reach the endpoint service, the service can be provided to the client by a plurality of different servers. This adds further complexity to the network, and makes it increasingly difficult to determine the location of a performance issue within the network.

SUMMARY

A method, in certain embodiments, may include deriving a baseline or a threshold for network performance of at least one endpoint in a network. The method may also include evaluating a service network status of the network by comparing current performance metrics of the at least one endpoint and the baseline or the threshold. In addition, the method includes determining, when the evaluated service network status is degraded, at least one node or at least one link that is causing the service network status to be degraded using a root cause analysis.

According to certain embodiments, an apparatus may include at least one memory including computer program code, and at least one processor. The at least one memory and the computer program code may be configured, with the at least one processor, to cause the apparatus at least to derive a baseline or a threshold for network performance of at least one endpoint in a network. The at least one memory and the computer program code may also be configured, with the at least one processor, at least to evaluate a service network status of the network by comparing current performance metrics of the at least one endpoint and the baseline or the threshold. In addition, the at least one memory and the computer program code may be configured, with the at least one processor, at least to determine, when the evaluated service network status is degraded, at least one node or at least one link that is causing the service network status to be degraded using a root cause analysis.

An apparatus, in certain embodiments, may include means for deriving a baseline or a threshold for network performance of at least one endpoint in a network. The apparatus may also include means for evaluating a service network status of the network by comparing current performance metrics of the at least one endpoint and the baseline or the threshold. In addition, the apparatus includes means for determining, when the evaluated service network status is degraded, at least one node or at least one link that is causing the service network status to be degraded using a root cause analysis.

According to certain embodiments, a non-transitory computer-readable medium encoding instructions that, when executed in hardware, perform a process. The process may include deriving a baseline or a threshold for network performance of at least one endpoint in a network. The process may also include evaluating a service network status of the network by comparing current performance metrics of the at least one endpoint and the baseline or the threshold. In addition, the process may include determining, when the evaluated service network status is degraded, at least one node or at least one link that is causing the service network status to be degraded using a root cause analysis.

According to certain embodiments, a computer program product encoding instructions for performing a process according to a method including deriving a baseline or a threshold for network performance of at least one endpoint in a network. The method may also include evaluating a service network status of the network by comparing current performance metrics of the at least one endpoint and the baseline or the threshold. In addition, the method includes determining, when the evaluated service network status is degraded, at least one node or at least one link that is causing the service network status to be degraded using a root cause analysis.

BRIEF DESCRIPTION OF THE DRAWINGS proper understanding of the invention, reference should be made to the accompanying drawings, wherein.

DETAILED DESCRIPTION

Certain embodiments can help to determine performance issues within a network. Specifically, network reachability and performance metrics, such as latency, packet loss, and/or bandwidth, through each possible path in the network may be evaluated. The overall service network status, also known as the service network status, may be a status of a network in which a given endpoint is providing a service. The service network status can be evaluated by comparing current performance metrics with a threshold or a baseline. The baseline may be derived based on historical network performance metrics that may be continuously collected, in some embodiments. The performance metrics may be collected, for example, using multipath probing, and may reflect the performance of the endpoint, or any other node within the network. The threshold may be either dynamic or static, and the dynamic threshold may be determined based on the baseline.

When the evaluated service network status may be degraded, the at least one node and/or the at least one link causing the service network status to be degraded can be determined. For example, when the service network status is indicated as being in a warning state or a critical state, a root cause analysis process can be applied to find the at least one node and/or the at least one link that contributes to the network performance degradation the most.

In certain embodiments, the service provided by the endpoint may be identified according to a server domain name, an internet protocol (IP) address, and/or a service protocol or port number. If the service is specified using a server domain name, a domain name system (DNS) query may be used to determine the list of possible IP addresses or endpoints associated with the domain name. As discussed above, there may be multiple endpoints providing a service or an endpoint that includes multiple servers that work together to provide a network service. In some embodiments, the multiple endpoints may be distributed across different geographical regions to provide optimum routes or paths based on a location of a client. The DNS query can help to determine the list of possible endpoints associated with the domain name.

In order to accurately determine or calculate the service network status, it may be helpful to discover or map the routes or paths included within the structure of the network. A route may be defined as a linear sequence of probed IP addresses or hops taken by a service request from the originating user equipment or probe to the endpoint. In other words, a route may be a path within the network taken by a request to reach an endpoint. Each route may include one or more network entities or hops, such as routers. A user equipment may be a mobile station, such as a mobile phone or smart phone or multimedia device, and/or a computer, such as a tablet, personal computer, or a laptop computer, provided with wireless or wired communication capabilities. In some embodiments, performance metrics within each route may not be gathered and evaluated. Rather, the routes included within the network may be traced without having to gather or evaluate the performance metrics of the individual routes.

A collection of one or more hops may be defined as a route or a path. Each hop may be connected to another hop by a physical network, with a final hop of a route being connected to the endpoint server. In certain embodiments, the performance measurements from two adjacent hops in each route can be used to calculate performance metrics for the connection between the hops. The connection between two or more hops may be termed a link or an edge.

In certain embodiments, a route tracing probe may be used to map or discover the multiple routes or paths in the network. In other embodiments, any other type of method may be used to determine, detect, or map the routes in the network. The detected routes may then be aggregated or merged, and a network map including the multiple routes may be constructed. The aggregating or merging of the routes may allow for the identifying of common hops or nodes in the network, as well as common links or edges within the network. For each merged edge, the transit likelihood may be calculated based on, for example, a number of times the edge was used or traversed versus the total number of routes mapped or traced in the network. The constructed network map may, in certain embodiments, be used to present the at least one node and/or the at least one link that contribute to the network performance degradation the most.

The service network status may represent the overall status of the network service being provided by one or more endpoints in the communication network. In certain embodiments, the service network status may be evaluated in order to provide an accurate view of the quality of network connectivity to the one or more endpoints providing the service. The evaluation of the service network status may focus on performance metrics at the at least one or more endpoints. The performance metrics of one or more endpoints may therefore be aggregated, in some embodiments, without taking into account any performance metrics of nodes or links within the path itself. Instead, in one embodiment, only the performance metrics of the one or more endpoints may be taken into account.

The status of the service network may be placed into any number of categories. In certain embodiments the status may categories as being in good, warning, or critical condition. A good status may mean that the measured performance of a network service has not been degraded enough to be deemed problematic. For example, a good status may be characterized as an application performance index of 75 or greater. A warning status may be applicable when some routes have a measured performance degradation. A warning status, for example, may be characterized as an application performance index between 50 and 75. A critical status, on the other hand, may indicate that a majority of the routes have measured performance degradation. For example, the critical status may be characterized as an application performance index of 50 or below.

In certain embodiments, the overall network service status may be calculated based in part on an application performance equation that can be used to calculate the application performance index. The application performance equation may, in some embodiments, weigh factors or measurements based on the significance of their outcomes. In one embodiment, the application performance index (API) may be calculated as follows:

$$API = 100 \times \frac{\text{Number of Good Endpoints} + (.5 \times \text{Number of Warning Endpoints})}{\text{Total Number of Endpoints}}$$

As described in the above equation, the application performance index may assign a weight of one half to the number of warning endpoints, as opposed to the number of good endpoints. In certain embodiments, the API may be customized or configured according to requirements or specification of different users.

The number of good endpoints and the number of warning endpoints used in the application performance index equation may also be calculated. Similar to the network service status, the status for each endpoint may also be assigned a specific category. The categories, for example, may be critical, warning, or good. The assignment of the endpoints into the categories may depend on the measured performance metrics at each endpoint. For example, the measured packet loss or latency at a given endpoint may determine to which category the endpoint belongs. In certain embodiments, the determination of whether an endpoint has a good, warning, or critical status may be based on one or more thresholds. In other words, in certain embodiments, one or more thresholds may be determined, and current performance metrics at each endpoint may be compared to the thresholds to determine the status of the endpoint. Thresholds may be either static or dynamic, and a dynamic threshold may be derived based on a baseline, in certain embodiments.

The current performance metrics may be determined based on an aggregation of samples. For example, one hundred samples of a packet loss measurement at a given endpoint may be aggregated and averaged. The averaged packet loss measurement may then be compared to a threshold packet loss set at a given endpoint. The thresholds may vary for each network, and may be customized according to requirements or specification of different users. Specific users requiring a higher network reliability may have higher thresholds than other users who may not require a high network reliability. In certain embodiments, static and dynamic thresholds may be configurable or customized. The equation used to derive the dynamic thresholds, for example, may be customizable or configurable. For example, a dynamic warning threshold may be 1.5 times the baseline, depending on the specific user.

Figure 1:
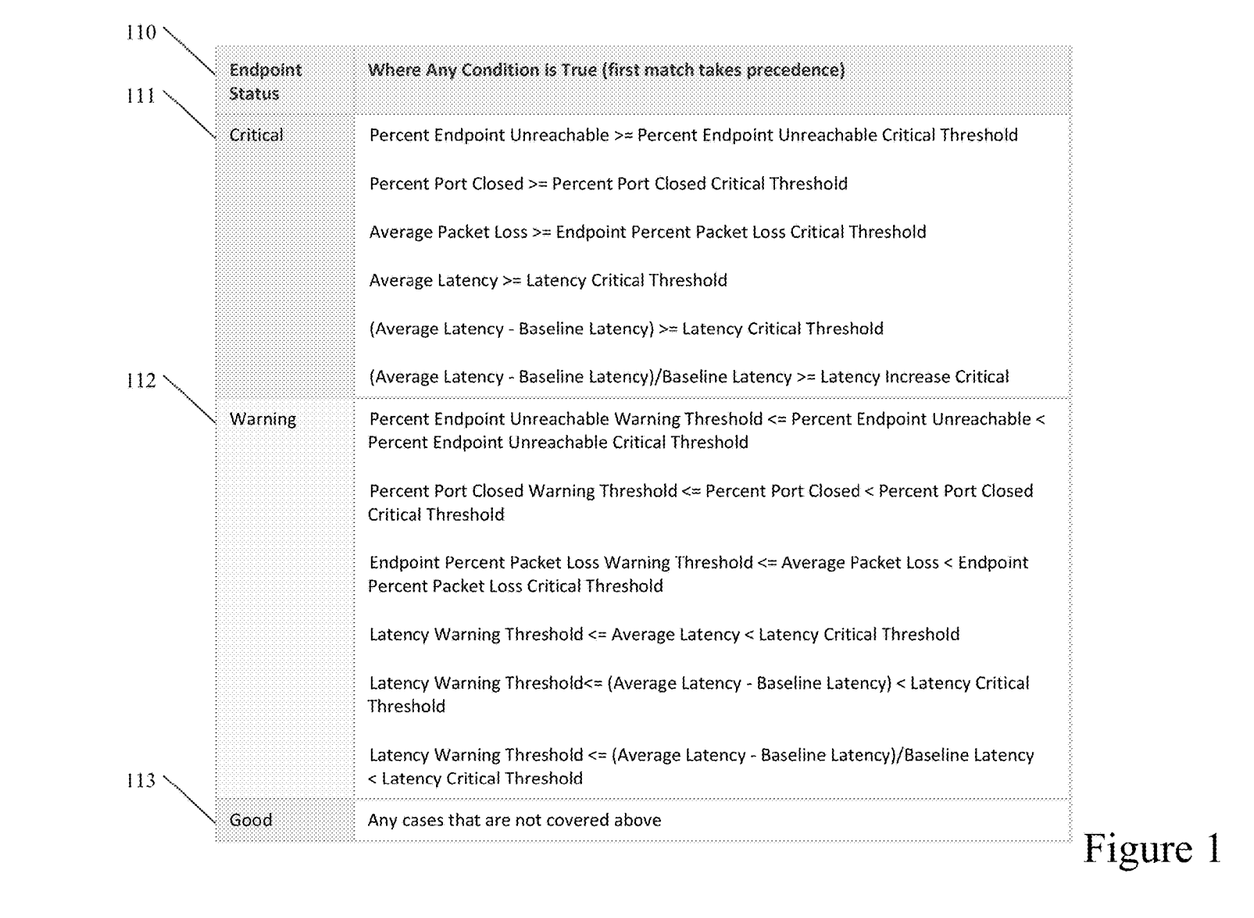
FIG. 1 illustrates an example of an endpoint status table according to certain embodiments.

FIG. 1 illustrates an example of an endpoint status table according to certain embodiments. As seen in FIG. 1, the endpoint status may be categorized into three different categories, critical 111, warning 112, and good 113. Each status can be determined based on comparing current performance metrics to baseline or thresholds that have been previously determined. The baseline may be determined based on statistical metrics of the collected performance metrics, such as average (AVG), minimum, maximum, and/or standard deviation (STDEV). The dynamic threshold equation, used to calculate the threshold, may then be derived based on the baseline statistical metrics. For example, the threshold may be represented according to the following equation: threshold=(AVG+2×STDEV). For example, a critical endpoint status 111 may be determined when the percent of endpoints being unreachable is greater than or equal to a threshold of the percent of endpoints being unreachable. The percent endpoint unreachable may be the number of requests that attempted, but were unable, to access the service provided by the endpoint, divided by the number of total requests to access the service provided by the same endpoint. The percentage endpoint unreachable may be represented by the following equation:

$$\text{Percent Port Closed} = \frac{\text{total number of traces that could not reach the endpoint}}{\text{total number of traces discovered for the endpoint}}.$$

An endpoint status may also be determined to be critical 111 when the percent of the port being closed is greater than or equal to a threshold percent of the port being closed. A port closed may mean that the port, or communication tunnel, for transmitting the request from the user equipment to the endpoint providing the service may be closed. A closed port may not allow the request message to be sent through the port to the service providing endpoint. The percentage port closed may be represented by the following equation:

$$\text{Percent Port Closed} = \frac{\text{total number of traces where } TCP-\text{reset was received}}{\text{total number of traces discovered for the endpoint}}.$$

The transmit control protocol (TCP) reset message may be sent from the network to a user equipment to indicate that a given port or communication tunnel may be closed, and that the port or communication tunnel cannot be used to transmit any further data. However, the TCP-reset message may be sent from either an intermediate firewall in the network or an endpoint. It may therefore be difficult to determine whether the port to the endpoint may actually be closed, or whether an intermediate network entity in the network may be sending the user equipment an indication that the port may be closed.

In another example, endpoint status 110 may be deemed critical 111 when the average packet loss is greater than or equal to a threshold percent of packet loss at an endpoint. The packet loss may be the number of packets that are sent by the user equipment that do not reach the endpoint. A critical status 111 may also be determined when the average latency is greater than or equal to a threshold latency. In other embodiments, critical status 111 can be determined when the average latency subtracted by the baseline latency is greater than or equal to the threshold latency. In some other embodiments, critical status 111 can be determined when a threshold of the latency increase is smaller than the average latency subtracted by the baseline latency, divided by the baseline latency, as can be seen in FIG. 1.

In another embodiments, endpoint status 110 may also be deemed to be in a warning status 112. The warning status 112 may be any performance metrics that measures above a warning performance metrics threshold but below a critical threshold, as shown in FIG. 1. As previously discussed, the critical status threshold and/or the warning status threshold may be dependent or customized based on the customer using the service provided by the endpoint. A good status 113 may be any performance metric that is less than the warning and critical thresholds.

The performance metrics thresholds or baselines may be either static or dynamic. In certain embodiments, the performance metrics latency may be calculated dynamically by taking into account the download time from the endpoint to the probe or user equipment. The download time may be estimated using the following equation: P=D+T×L, where P is the overall page download time, D is the pure data transmission time, T is the number of round trips, and L is the end to end dynamic latency.

The latency increase factor and the threshold of critical and warning latency values may be defined using the following equation: Latency Increase $$\text{Factor} = \text{Service Degradation Factor} + \frac{D_{avg}}{T_{avg} \times Latency_{base}}.$$

The latency critical threshold may be one half of the latency increase factor, while the latency warning threshold may be one quarter of the latency increase factor. For example, when the service degradation factor is set to 200%, the performance may be considered to be critically degraded when the overall download time may be doubled. Latency-$_{Base}$ may be the baseline or threshold latency for the endpoint.

As previously discussed, in order to evaluate the status of the service as a whole, the performance metrics for each endpoint from each of the traced paths or routes may be aggregated. Each trace may include a sequence of IP addresses discovered on a route from the user equipment, which may act as a probing machine, to the endpoint providing the service. Each unique sequence of IP addresses may be considered a path or a route. For each path or route, the transit likelihood may be determined. Transit likelihood may be the number of times that the path was discovered or used by the probe over the total number of traces recorded. Transmit likelihood of the path may therefore be represented by the following equation:

$$\text{Transmit } Likelihood_{path} = \frac{\text{Total Path Traversals}}{\text{Total Traces}}.$$

The total path traversals may be the number of times that a given path was discovered as part of a trace probing process, for example.

In certain embodiments, for each path, the averages for all performance metrics for the endpoint at each path may be calculated. These average values may be weighted based on the Transit Likelihood for the path, and aggregated to yield the aggregated performance metrics for the service network. For example, the transmit likelihood for a given path that ends with endpoint A is 0.99, while the transmit likelihood for the given path that ends with endpoint B is 0.01. This means that out of 100 paths traces by the probe, 99 may end up at endpoint A while 1 may end up at endpoint B. The average values of the aggregated performance metrics at endpoint A may therefore be weighted to reflect that the collected metrics at endpoint A may be more statistically accurate than the average value of the aggregated performance metrics at endpoint B, since 99 percent of the traced paths include endpoint A.

As discussed above, the different paths in the network may first be traced using a probe, for example. Next, baseline or threshold values for network performance at the at least one endpoint in the network may be derived. The baselines and threshold values may be customized according the specifications of the user attempting to access a given service provided by the endpoint via a user equipment. The service network status may then be evaluated by comparing current performance metrics at the at least one endpoint to the predetermined baselines or thresholds. When the evaluated service network status is deemed to be degraded, and are characterized as either having a critical or a warning status, at least one node or at least one link causing the degraded service network status may be determined. For example, the service network status may be degraded when the status is at a critical or a warning status.

Locating the one or more network entities causing the network performance degradation may include a root cause analysis, in certain embodiments. The root analysis may identify which of the paths include endpoints that do not have a good status. If any given endpoint, for example, has a warning or critical latency status, the warning or critical links that have had the highest latency change from the threshold or baseline values may be identified as potential root cause links. In certain embodiments, for example, the group that includes the highest latency change may include the top 25% of the links having the highest latency change from the threshold or baseline values. In other embodiments, the percentage of what is deemed to be the highest latency change may be adjusted to be higher or lower than 25%. In some other embodiments, any parameter other than latency may be chosen, for example, packet loss. The links associated with the highest packet loss change may be identified, mapped to the network map configured during path discovery, and used by a user or in internet service provider to pinpoint or correct the potential performance issues.

In some embodiments, the root cause analysis may be evaluated using both the latency change and the packet loss. In other words, the at least one node and/or at least one link may be identified using the latency change of the endpoints. Once the group having the highest latency change may be identified, a sub-group of the group having the highest packet loss may be identified. For each node on the network paths, the status of individual nodes may be derived from the status of ingress link or egress link surrounding any given individual node. When the ingress links and the egress links of the node have at least one link which has a critical status, the node may be deemed to have a critical status. When the ingress links and the egress links of the node have at least one link which has a warning status, the node may be deemed to have a warning status.

As discussed above, in certain embodiments, the links associated with the highest packet loss change may be highlighted, and mapped to the network map configured during path discovery. The network map may be a graph of some or all of the discovered network paths. The at least one node or the at least one link causing the service network status to be degraded may be highlighted, bolded, or indicated in any other way within the network map. The network map may then be displayed to a user or a network provider via a user interface. In other embodiments, the at least one node or the at least one link may be displayed, reported, or sent to the user or the network provider in any other manner. In some embodiments, the at least one node or the at least one link associated with performance degradation may be reported to a network provider. The displaying may therefore trigger the network provider to fix or repair the at least one node or the at least one link that is causing the service network status to be degraded.

In certain embodiments, a network administrative task may be performed as a result of the root cause analysis in order to fix the degraded service network status. For example, the network may divert all traffic away from a node or hop within the network.

Figure 2:
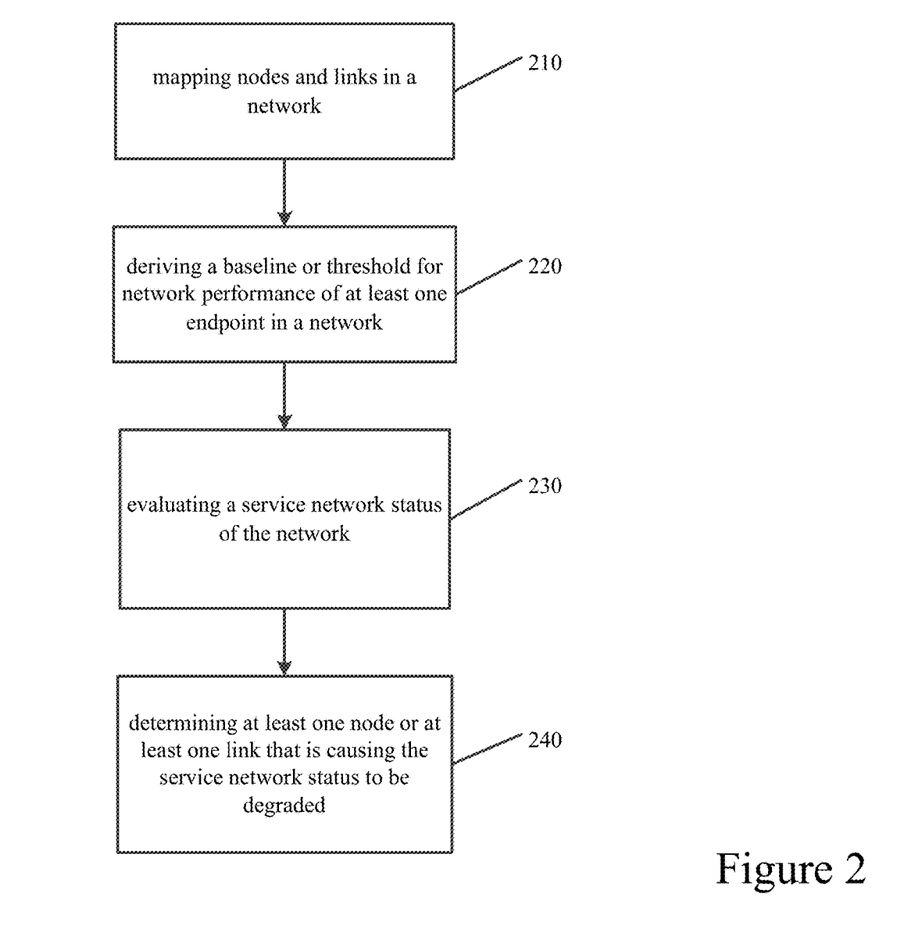
FIG. 2 illustrates an example of a flow diagram according to certain embodiments.

FIG. 2 illustrates an example of a flow diagram according to certain embodiments. Certain embodiments may include mapping the at least one node or the at least one link using a trace routing probing in the network, as shown in step 210. In step 220, a baseline or threshold for network performance of at least one endpoint in a network may be determined. The entity determining the baseline or threshold may be the same entity that maps the at least one node or at least one link. For example, the process may be performed by a server that is either located within or is able to communicate with the communication network. In certain embodiments, the entity may continuously receive measurements, such as routes, packets loss, latency, and/or any other network measurement described above, from a probe. The baseline or threshold may be static or dynamic. For example, the baseline or threshold may be a dynamic latency measurement. In step 230 a service network status of the network may be evaluated by comparing a current performance metrics of the at least one endpoint to the baseline or threshold. The current performance metrics may be an aggregated metric at one of the endpoints.

The service network status may represent an overall status to the at least one endpoint over all mapped paths. The service network status may be categorized as having a good status, a warning status, and/or a critical status. The evaluated service network status may be said to be degraded when the service network status is in a critical or a warning status. In certain embodiments, the service network status may be calculated based on an application performance index.

In step 240, the at least one node or at least one link that is causing degradation of the service network status may be determined using, for example, a root cause analysis. The determined at least one node or at least one link may then be displayed via a user interface. For example, the at least one node or the at least one link may be highlighted in a configured network map. The at least one node or the at least one link may therefore be reported to a network provider or a user of the user equipment attempting to access the network service provided by the at least one endpoint. The displaying of the at least one node or that at least one link may trigger the network provider to fix or repair the at least one node or the at least one link that is causing the service network status to be degraded.

Figure 3:
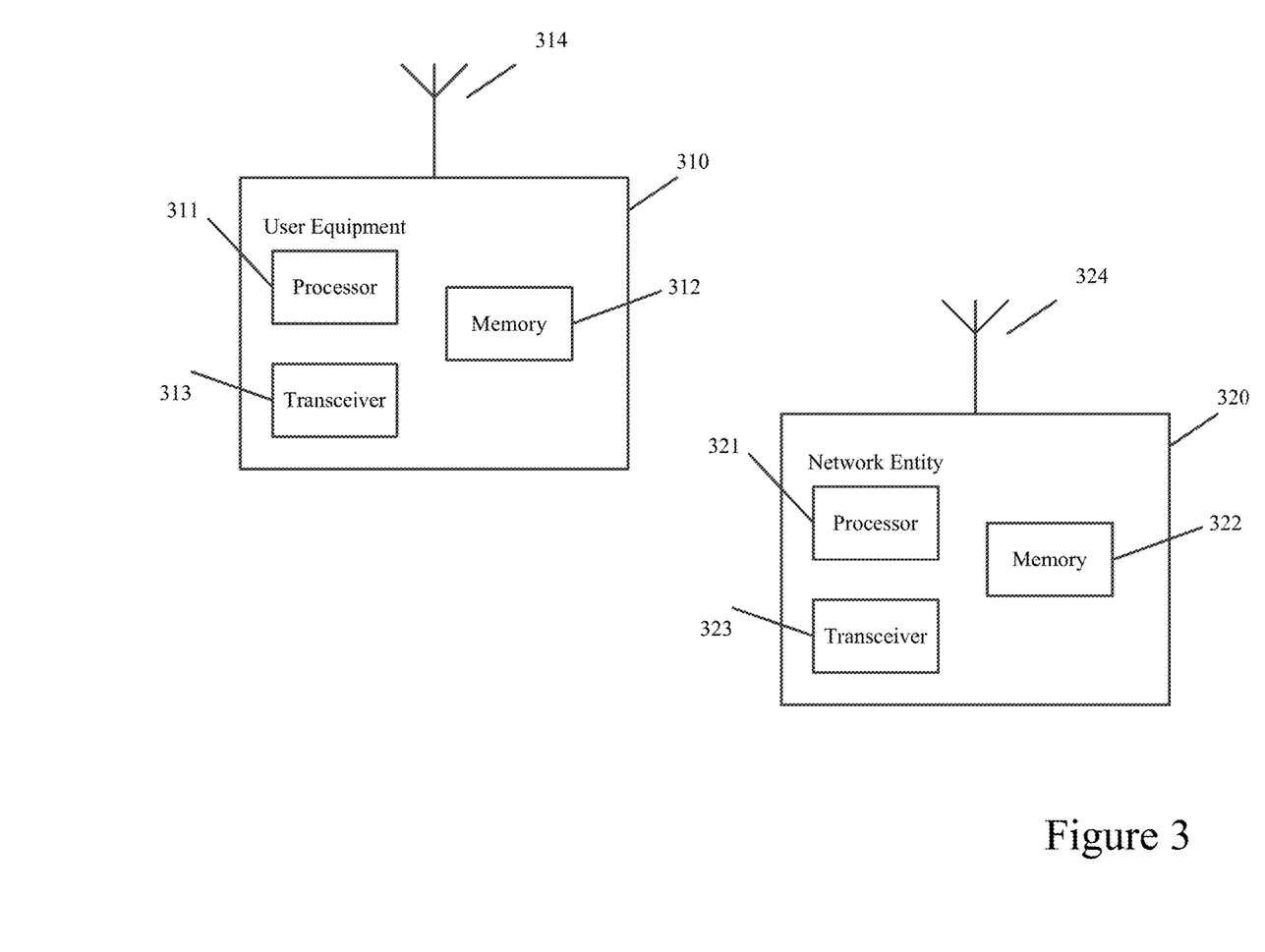
FIG. 3 illustrates an example of a system according to certain embodiments.

FIG. 3 illustrates an example of a system according to certain embodiments. It should be understood that each signal or block in FIGS. 1 and 2 may be implemented by various means or their combinations, such as hardware, software, firmware, one or more processors and/or circuitry. In one embodiment, a system may include several devices, such as, for example, network entity 320 or user equipment 310. The system may include more than one user equipment 310 and more than one network entity 320, although only one access node is shown for the purposes of illustration. The network entity may be a router, a proxy server, a network node, a server, a host, a base station, or any of the other network nodes discussed herein. Network entity 320, may also be a third party server that is either located within the communication network or is able to communicate with the communication network. The third party server may not be controlled by the internet service provider, in certain embodiments.

Each of these devices may include at least one processor or control unit or module, respectively indicated as 311 and 321. At least one memory may be provided in each device, and indicated as 312 and 322, respectively. The memory may include computer program instructions or computer code contained therein. One or more transceiver 313 and 323 may be provided, and each device may also include an antenna, respectively illustrated as 314 and 324. Although only one antenna each is shown, many antennas and multiple antenna elements may be provided to each of the devices. Higher category user equipment generally include multiple antenna panels. Other configurations of these devices, for example, may be provided. For example, network entity 320 and user equipment 310 may be additionally or alternatively be configured for wired communication, in addition to wireless communication, and in such a case antennas 314 and 324 may illustrate any form of communication hardware, without being limited to merely an antenna.

Transceivers 313 and 323 may each, independently, be a transmitter, a receiver, or both a transmitter and a receiver, or a unit or device that may be configured both for transmission and reception. In other embodiments, the user equipment or the network entity may have at least one separate receiver or transmitter. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

A user device or user equipment 310 may be a mobile station (MS) such as a mobile phone or smart phone or multimedia device, a computer, such as a tablet, personal computer, or a laptop computer, provided with wireless communication capabilities. User equipment 310 may also be personal data or digital assistant (PDA) provided with wireless communication capabilities, portable media player, digital camera, pocket video camera, navigation unit provided with wireless communication capabilities or any combinations thereof.

In some embodiments, an apparatus, such as a user equipment 310 or a network entity 320 may include means for carrying out embodiments described above in relation to FIGS. 1 and 2. In certain embodiments, at least one memory including computer program code can be configured to, with the at least one processor, cause the apparatus at least to perform any of the processes described herein.

Processors 311 and 321 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 312 and 322 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network entity 320 or user equipment 310, to perform any of the processes described above (see, for example, FIGS. 1 and 2). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

Furthermore, although FIG. 3 illustrates a system including a network entity 320 and user equipment 310, certain embodiments may be applicable to other configurations, and configurations involving additional elements, as illustrated and discussed herein. For example, multiple user equipment devices and multiple network entities may be present, or other nodes providing similar functionality, such as nodes that combine the functionality of a user equipment and an network entity, such as a relay node. The user equipment 310 may likewise be provided with a variety of configurations for communication other than communication network entity 320. For example, the user equipment 310 may be configured for device-to-device or machine to machine communication.

The above embodiments provide for improvements to the functioning of a network and/or to the functioning of the nodes or computers within the network, or the user equipment communicating with the network. Specifically, certain embodiments can help to determine performance degradation within a communication network. Some embodiments can then determine at least one node or at least one link in the communication network that may potentially be causing the performance degradation. The at least one node or at least one link may then be displayed or reported to the user or the network provider, which may then fix or repair the at least one node or at least one link. Fixing or repairing the at least one node or the at least one link can help to improve the overall performance of the network, as well as the availability and performance of the network service.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

We claim:

1. A method, comprising:
   deriving a baseline for network performance of at least one endpoint in a network, wherein the baseline is derived based on historical network performance metrics, and the baseline is dynamic;
   calculating a service network status of the network based on an application performance index;
   evaluating the service network status of the network by comparing current performance metrics of the at least one endpoint to the baseline for the network performance, in order to determine whether the service network status is degraded; and
   determining, when the evaluated service network status is degraded, at least one node or at least one link that is causing the service network status to be degraded using a root cause analysis.

2. The method according to claim 1, further comprising:
   mapping the at least one node or the at least one link using a traceroute probe.

3. The method according to claim 1, wherein the current performance metrics of the at least one endpoint is an aggregated metric.

4. The method according to claim 1, wherein the service network status represents an overall status to the at least one endpoint over all mapped paths.

5. The method according to claim 1, wherein the service network status has a good status, a warning status, or a critical status.

6. The method according to claim 1, wherein the baseline comprises a dynamic latency measurement.

7. The method according to claim 1, further comprising:
   aggregating the current performance metrics of the at least one endpoint, wherein the aggregated current performance metrics are evaluating the service network status of the network.

8. The method according to claim 1, wherein the evaluated service network status is degraded when the service network status has a critical or a warning status.

9. The method according to claim 1, further comprising:
   displaying the at least one node or the at least one link causing the service network status to be degraded via a user interface.

10. The method according to claim 9, wherein the displaying triggers a fixing or repairing of the at least one node or the at least one link that is causing the service network status to be degraded.

11. The method according to claim 1, further comprising:
    reporting of the at least one node or the at least one link to a network provider or a user.

12. The method according to claim 1, further comprising:
    performing a network administrative task based on a result of the root cause analysis to fix the degraded service network status.

13. An apparatus, comprising:
    at least one memory comprising a computer program code;
    at least one processor;
    wherein the at least one memory and the computer program code are configured, along with the at least one processor, to cause the apparatus at least to:
    derive a baseline for network performance of at least one endpoint in a network, wherein the baseline is derived based on historical network performance metrics, and the baseline is dynamic;
    calculate a service network status of the network based on an application performance index
    evaluate the service network status of the network by comparing current performance metrics of the at least one endpoint to the baseline for the network performance, in order to determine whether the service network status is degraded; and
    determine, when the evaluated service network status is degraded, at least one node or at least one link that is causing the service network status to be degraded using a root cause analysis.

14. The apparatus according to claim 13, wherein the at least one memory and the computer program code are configured, along with the at least one processor, to cause the apparatus at least to:
    display the at least one node or the at least one link causing the service network status to be degraded via a user interface.

15. The apparatus according to claim 13, wherein the displaying triggers a fixing or repairing of the at least one node or the at least one link that is causing the service network status to be degraded.

16. The apparatus according to claim 13, wherein the at least one memory and the computer program code are configured, along with the at least one processor, to cause the apparatus at least to:
    report of the at least one node or the at least one link to a network provider or a user.

17. The apparatus according to claim 13, wherein the current performance metrics of the at least one endpoint is an aggregated metric.

18. The apparatus according to claim 13, wherein the at least one memory and the computer program code are configured, along with the at least one processor, to cause the apparatus at least to:
  aggregate the current performance metrics of the at least one endpoint, wherein the aggregated current performance metrics are evaluating the service network status of the network.

\* \* \* \* \*